(12) United States Patent
Zhou et al.

(10) Patent No.: US 9,736,855 B2
(45) Date of Patent: Aug. 15, 2017

(54) SYSTEM AND METHOD FOR MULTIPLE STATION CAMPING CHANNELS IN A WIRELESS COMMUNICATION NETWORK

(71) Applicant: QUALCOMM Incorporated, San Diego, CA (US)

(72) Inventors: Yan Zhou, San Diego, CA (US); Gwendolyn Denise Barriac, Encinitas, CA (US); Simone Merlin, Solana Beach, CA (US); George Cherian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 79 days.

(21) Appl. No.: 14/626,766

(22) Filed: Feb. 19, 2015

(65) Prior Publication Data
US 2016/0249378 A1 Aug. 25, 2016

(51) Int. Cl.
*H04W 72/12* (2009.01)
*H04W 74/04* (2009.01)
*H04W 16/14* (2009.01)
*H04W 84/12* (2009.01)

(52) U.S. Cl.
CPC ....... *H04W 72/1268* (2013.01); *H04W 74/04* (2013.01); *H04W 16/14* (2013.01); *H04W 84/12* (2013.01)

(58) Field of Classification Search
None
See application file for complete search history.

(56) References Cited

U.S. PATENT DOCUMENTS

| 8,600,336 B2 | 12/2013 | Meylan et al. |
| 2014/0050093 A1 | 2/2014 | Liu et al. |
| 2014/0064101 A1 | 3/2014 | Hart et al. |
| 2014/0066085 A1* | 3/2014 | Sun ................. H04W 72/082 455/454 |
| 2014/0105201 A1 | 4/2014 | Seok |
| 2014/0169356 A1 | 6/2014 | Noh et al. |

(Continued)

FOREIGN PATENT DOCUMENTS

WO WO-2014197764 A1 12/2014

OTHER PUBLICATIONS

International Search Report and Written Opinion—PCT/US2016/013919 ISA/EPO—May 4, 2016.

*Primary Examiner* — Steven H Nguyen
(74) *Attorney, Agent, or Firm* — Knobbe, Martens, Olson & Bear LLP

(57) ABSTRACT

Systems and methods for wireless communication are disclosed. In one aspect an access point transmits a message to a first device and a second device on a first channel, the message sufficient to inform the first device to camp on a first channel during a time slot and the message sufficient to inform the second device to camp on a second channel during the time slot. The access point further determines whether the first channel is busy during the time slot. If the first channel is determined to not be busy during the time slot, the access point communicates with the first device on the first channel during the time slot. If the first channel is determined to be busy during the time slot, the access point communicates with the second device on the second channel during the time slot.

30 Claims, 10 Drawing Sheets

(56) References Cited

U.S. PATENT DOCUMENTS

| | | | |
|---|---|---|---|
| 2014/0307653 A1* | 10/2014 | Liu | H04B 7/2612 |
| | | | 370/329 |
| 2014/0328235 A1 | 11/2014 | Merlin et al. | |
| 2015/0131517 A1* | 5/2015 | Chu | H04W 72/005 |
| | | | 370/312 |
| 2015/0188675 A1* | 7/2015 | Abeysekera | H04W 72/04 |
| | | | 370/329 |
| 2015/0365940 A1* | 12/2015 | Chu | H04B 7/0452 |
| | | | 370/329 |
| 2016/0007342 A1* | 1/2016 | Seok | H04B 7/0452 |
| | | | 370/338 |

* cited by examiner

SYSTEM AND METHOD FOR MULTIPLE STATION CAMPING CHANNELS IN A WIRELESS COMMUNICATION NETWORK

BACKGROUND

Field

The present application relates generally to wireless communications, and more specifically to systems, methods, and devices for allowing multiple stations to camp across multiple channels of a wireless network.

Background

In many telecommunication systems, communications networks are used to exchange messages among several interacting spatially-separated devices. Networks may be classified according to geographic scope, which could be, for example, a metropolitan area, a local area, or a personal area. Such networks would be designated respectively as a wide area network (WAN), metropolitan area network (MAN), local area network (LAN), or personal area network (PAN). Networks also differ according to the switching/routing technique used to interconnect the various network nodes and devices (e.g. circuit switching vs. packet switching), the type of physical media employed for transmission (e.g. wired vs. wireless), and the set of communication protocols used (e.g. Internet protocol suite, SONET (Synchronous Optical Networking), Ethernet, etc.).

Wireless networks are often preferred when the network elements are mobile and thus have dynamic connectivity needs, or if the network architecture is formed in an ad hoc, rather than fixed, topology. Wireless networks employ intangible physical media in an unguided propagation mode using electromagnetic waves in the radio, microwave, infra-red, optical, etc. frequency bands. Wireless networks advantageously facilitate user mobility and rapid field deployment when compared to fixed wired networks.

The devices in a wireless network may transmit/receive information between each other. The information may comprise packets, which in some aspects may be referred to as data units. The packets may include overhead information (e.g., header information, packet properties, etc.) that helps in routing the packet through the network, identifying the data in the packet, processing the packet, etc., as well as data, for example user data, multimedia content, etc. as might be carried in a payload of the packet.

SUMMARY

Various implementations of systems, methods and devices within the scope of the appended claims each have several aspects, no single one of which is solely responsible for the desirable attributes described herein. Without limiting the scope of the appended claims, some prominent features are described herein. After considering this discussion, and particularly after reading the section entitled "Detailed Description" one will understand how the features of various implementations allow sleep time for an access point.

One aspect of the present disclosure provides a method for transmitting over a wireless communications network. The method includes transmitting a message to a first device and a second device on a first channel, the message sufficient to inform the first device to camp on a first channel during a time slot and the message sufficient to inform the second device to camp on a second channel during the time slot, determining whether the first channel is busy during the time slot, if the first channel is determined to not be busy during the time slot, communicating with the first device on the first channel during the time slot, and if the first channel is determined to be busy during the time slot, communicating with the second device on the second channel during the time slot. The first channel may include a primary channel of the wireless communications network, and the message may include a beacon. The time slot may be a period of time until a next beacon. Communicating with the second device on the second channel during the time slot may include determining if the second channel is busy and if the second channel is not busy, communicating with the second device on the second channel. Communicating with the second device on the second channel may include transmitting a trigger frame to the second device on the second channel indicating that the second device may transmit an uplink transmission. The message may be further transmitted to a third device, and may be sufficient to inform the third device to camp on a third channel during the time slot, and the method may further include, if the first channel and the second channel are determined to be busy during the time slot, communicating with the third device on the third channel during the time slot.

In some aspects, the message informs two or more devices to camp on the first channel, and further informs two or more devices to camp on the second channel. The method may further include receiving a second message from one or more of the first device and the second device, the second message indicating that the device transmitting the second message will camp on an assigned channel. In some aspects, determining whether the first channel is busy during the time slot may include using one or more of preamble detection and energy detection to determine whether the first channel is busy during the first time slot. In some aspects, the message may be further sufficient to inform a third device to camp on the first channel during a second time slot and the message sufficient to inform a fourth device to camp on the second channel during the second time slot. In some aspects, determining whether the first channel is busy during the time slot may include determining that the first channel is busy during a first portion of the time slot, and communicating with the second device on the second channel during the time slot may include communicating with the second device on the second channel during the first portion of the time slot.

One aspect of the present disclosure describes a device for transmitting over a wireless communications network, the device including a transmitter configured to transmit a message to a first device and a second device on a first channel, the message sufficient to inform the first device to camp on a first channel during a time slot and the message sufficient to inform the second device to camp on a second channel during the time slot, and a processor configured to determine whether the first channel is busy during the time slot, if the first channel is determined to not be busy during the time slot, communicate with the first device on the first channel during the time slot, and if the first channel is determined to be busy during the time slot, communicate with the second device on the second channel during the time slot.

In one aspect, the present disclosure provides a device for transmitting over a wireless communications network, the device including means for transmitting a message to a first device and a second device on a first channel, the message sufficient to inform the first device to camp on a first channel during a time slot and the message sufficient to inform the second device to camp on a second channel during the time slot, means for determining whether the first channel is busy during the time slot, means for communicating with the first device on the first channel during the time slot if the first channel is determined to not be busy during the time slot, and means for communicating with the second device on the second channel during the time slot if the first channel is determined to be busy during the time slot.

One aspect of the present disclosure provides a non-transitory computer-readable medium comprising code that, when executed, causes an apparatus to transmit a message to a first device and a second device on a first channel, the message sufficient to inform the first device to camp on a first channel during a time slot and the message sufficient to inform the second device to camp on a second channel during the time slot, determine whether the first channel is busy during the time slot, if the first channel is determined to not be busy during the time slot, communicate with the first device on the first channel during the time slot, and if the first channel is determined to be busy during the time slot, communicate with the second device on the second channel during the time slot.

DETAILED DESCRIPTION

Figure 1:
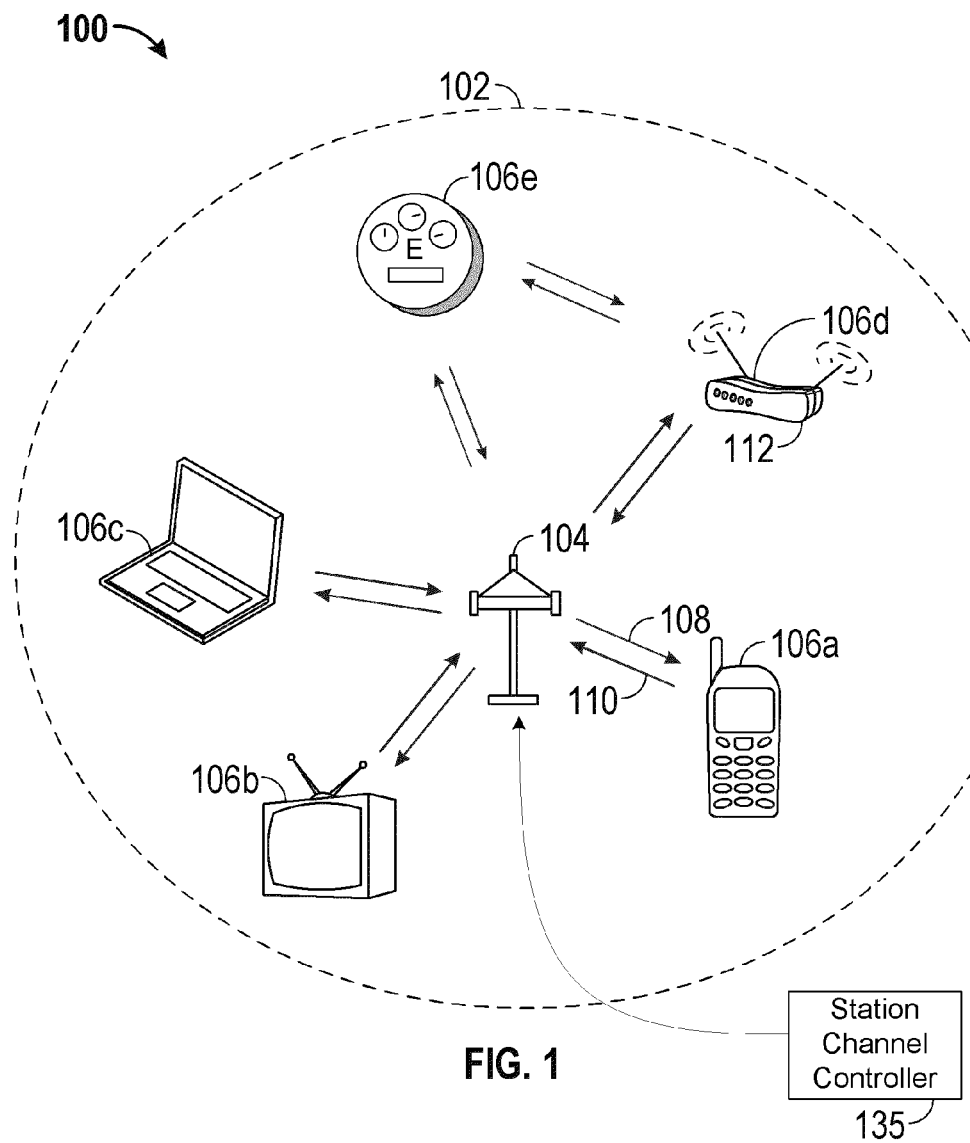
FIG. 1 illustrates an example of a wireless communication system in which aspects of the present disclosure may be employed.

Various aspects of the novel systems, apparatuses, and methods are described more fully hereinafter with reference to the accompanying drawings. The teachings disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of or combined with any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Wireless network technologies may include various types of wireless local area networks (WLANs). A WLAN may be used to interconnect nearby devices together, employing widely used networking protocols. The various aspects described herein may apply to any communication standard, such as WiFi or, more generally, any member of the IEEE 802.11 family of wireless protocols. In some aspects, wireless signals may be transmitted according to an 802.11 protocol using orthogonal frequency-division multiplexing (OFDM), direct-sequence spread spectrum (DSSS) communications, a combination of OFDM and DSSS communications, or other schemes.

In some implementations, a WLAN includes various devices which are the components that access the wireless network. For example, there may be two types of devices: access points ("APs") and clients (also referred to as stations, commonly known as "STAs"). In general, an AP serves as a hub or base station for the WLAN and a STA serves as a user of the WLAN. For example, an STA may be a laptop computer, a personal digital assistant (PDA), a mobile phone, etc. In an example, an STA connects to an AP via a WiFi (e.g., IEEE 802.11 protocol) compliant wireless link to obtain general connectivity to the Internet or to other wide area networks. In some implementations, an STA may also be used as an AP.

An access point ("AP") may also comprise, be implemented as, or known as a NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, or some other terminology. The access point may be a main or relay base station. A relay base station relays data between wireless stations and another base station, being the main base station or another relay base station.

A station "STA" may also comprise, be implemented as, or known as an access terminal ("AT"), a subscriber station, a subscriber unit, a mobile station, a remote station, a remote terminal, a user terminal, a user agent, a user device, user equipment, or some other terminology. In some implementations, an access terminal may comprise a cellular telephone, a cordless telephone, a Session Initiation Protocol ("SIP") phone, a wireless local loop ("WLL") station, a personal digital assistant ("PDA"), a handheld device having wireless connection capability, or some other suitable processing device connected to a wireless modem. Accordingly, one or more aspects taught herein may be incorporated into a phone (e.g., a cellular phone or smartphone), a computer (e.g., a laptop), a portable communication device, a headset, a portable computing device (e.g., a personal data assistant), an entertainment device (e.g., a music or video device, or a satellite radio), a gaming device or system, a global positioning system device, or any other suitable device that is configured to communicate via a wireless medium.

FIG. 1 illustrates an example of a wireless communication system 100 in which aspects of the present disclosure may be employed. The wireless communication system 100 may operate pursuant to a wireless standard. The wireless communication system 100 may include an AP 104, which communicates with STAs 106.

A variety of processes and methods may be used for transmissions in the wireless communication system 100 between the AP 104 and the STAs 106. For example, signals may be sent and received between the AP 104 and the STAs 106 in accordance with OFDM/OFDMA techniques. If this is the case, the wireless communication system 100 may be referred to as an OFDM/OFDMA system. Alternatively, signals may be sent and received between the AP 104 and the STAs 106 in accordance with CDMA techniques. If this is the case, the wireless communication system 100 may be referred to as a CDMA system.

A communication link that facilitates transmission from the AP 104 to one or more of the STAs 106 may be referred to as a downlink (DL) 108, and a communication link that facilitates transmission from one or more of the STAs 106 to the AP 104 may be referred to as an uplink (UL) 110. Alternatively, a downlink 108 may be referred to as a forward link or a forward channel, and an uplink 110 may be referred to as a reverse link or a reverse channel.

The AP 104 may act as a base station and provide wireless communication coverage in a basic service area (BSA) 102. The AP 104 along with the STAs 106 associated with the AP 104 that use the AP 104 for communication may be referred to as a basic service set (BSS). It should be noted that the wireless communication system 100 may not have a central AP 104, but rather may function as a peer-to-peer network between the STAs 106. Accordingly, the functions of the AP 104 described herein may alternatively be performed by one or more of the STAs 106.

The STAs 106 are not limited in type and may include a variety of different STAs. For example, as illustrated in FIG. 1, STAs 106 can include a cellular phone 106a, a television 106b, a laptop 106c, and a number of sensors 106d (e.g. a weather sensor or other sensor capable of communicating using a wireless protocol), to name a few. The AP 104 may further contain a station channel controller module 135. This module 135 may contain instructions for configuring multiple STAs to camp on multiple channels, in order to allow the AP 104 to transition more seamlessly between multiple channels in the case that certain channels are in use. Further details of such instructions are described herein.

Figure 2:
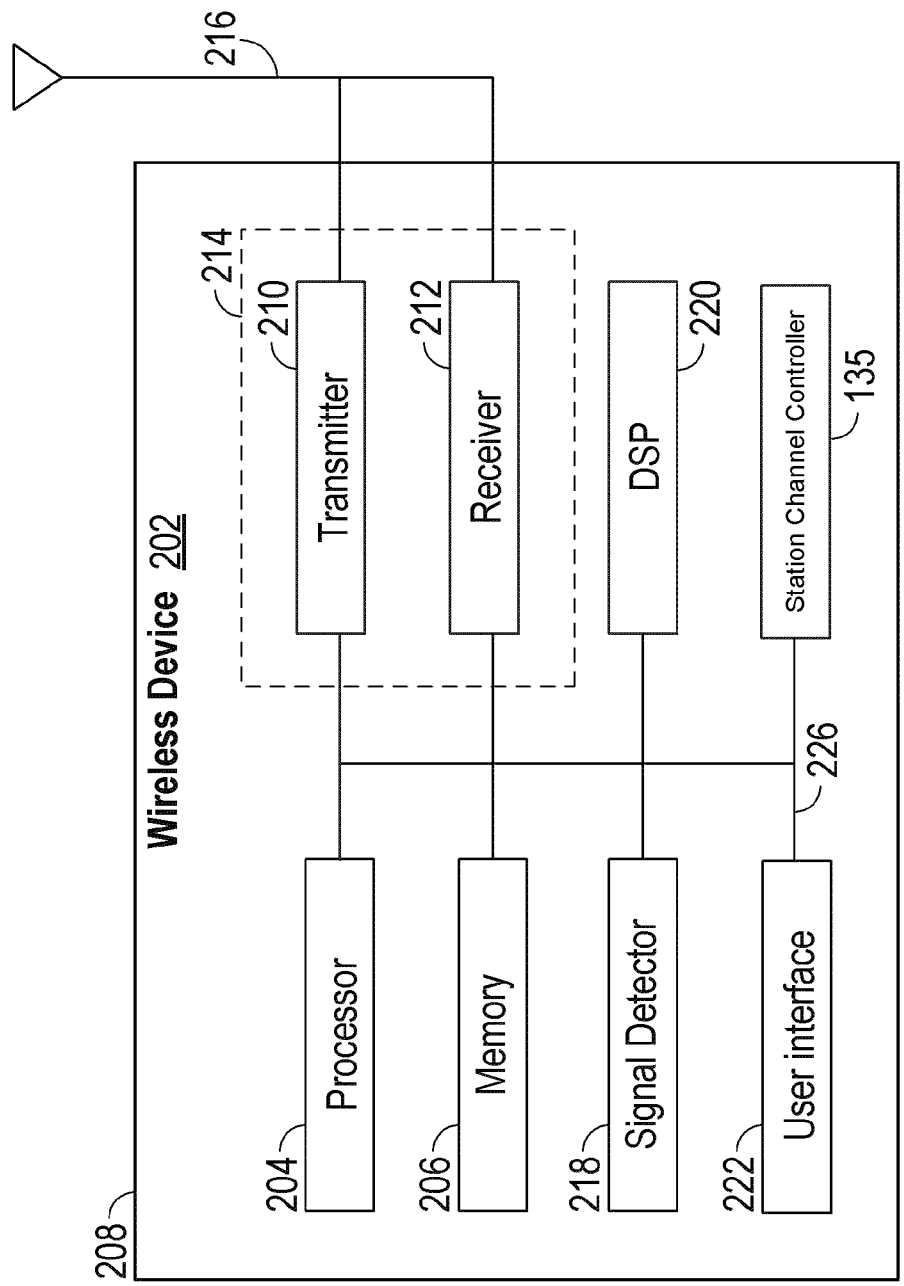
FIG. 2 illustrates an example of a wireless device that may be employed within the wireless communication system of FIG. 1.

FIG. 2 illustrates various components that may be utilized in a wireless device 202 that may be employed within the wireless communication system 100. The wireless device 202 is an example of a device that may be configured to implement the various methods described herein. For example, the wireless device 202 may comprise the AP 104 or one of the STAs 106.

The wireless device 202 may include a processor 204 which controls operation of the wireless device 202. The processor 204 may also be referred to as a central processing unit (CPU). Memory 206, which may include both read-only memory (ROM) and random access memory (RAM), provides instructions and data to the processor 204. A portion of the memory 206 may also include non-volatile random access memory (NVRAM). The processor 204 typically performs logical and arithmetic operations based on program instructions stored within the memory 206. The instructions in the memory 206 may be executable to implement the methods described herein.

The processor 204 may comprise or be a component of a processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

The wireless device 202 may also include a transmitter 210 and a receiver 212 to allow transmission and reception of data between the wireless device 202 and a remote location. Further, the transmitters 210 and the receiver 212 may be configured to allow transmission and reception of setup and/or configuration packets or frames between the wireless device 202 and a remote location including, for example, an AP. The transmitter 210 and receiver 212 may be combined into a transceiver 214. An antenna 216 may be attached to the housing 208 and electrically coupled to the transceiver 214. Alternatively, or additionally, the wireless device 202 may include an antenna 216 formed as part of the housing 208 or may be an internal antenna. The wireless device 202 may also include (not shown) multiple transmitters, multiple receivers, multiple transceivers, and/or multiple antennas.

The wireless device 202 may also include a signal detector 218 that may be used in an effort to detect and quantify the level of signals received by the transceiver 214. The signal detector 218 may detect such signals as total energy, energy per subcarrier per symbol, power spectral density and other signals. The wireless device 202 may also include a digital signal processor (DSP) 220 for use in processing signals. The DSP 220 may be configured to generate a data unit for transmission. In some aspects, the data unit may comprise a physical layer data unit (PPDU). In some aspects, the PPDU is referred to as a packet or a frame.

The wireless device 202 may further comprise a user interface 222 in some aspects. The user interface 222 may comprise a keypad, a microphone, a speaker, and/or a display. The user interface 222 may include any element or component that conveys information to a user of the wireless device 202 and/or receives input from the user.

The various components of the wireless device 202 may be housed within a housing 208. Further, the various components of the wireless device 202 may be coupled together by a bus system 226. The bus system 226 may include a data bus, for example, as well as a power bus, a control signal bus, and a status signal bus in addition to the data bus. Those of skill in the art will appreciate the components of the wireless device 202 may be coupled together, or may accept or provide inputs to each other using some other mechanism.

Although a number of separate components are illustrated in FIG. 2, those of skill in the art will recognize that one or more of the components may be combined or commonly implemented. For example, the processor 204 may be used to implement not only the functionality described above with respect to the processor 204, but also to implement the functionality described above with respect to the signal detector 218 and/or the DSP 220. Further, each of the components illustrated in FIG. 2 may be implemented using a plurality of separate elements. The device 202 may further contain a station channel controller module 135. This module 135 may contain instructions for configuring multiple STAs 106 to camp on multiple channels, in order to allow the device 104 to transition more seamlessly between multiple channels in the case that certain channels are in use. Further details of such instructions are described herein.

Multiple Station Camping Channels

Generally, wireless communications may occur on a particular portion of a bandwidth, which may be referred to as a channel. In some aspects, an AP and its associated STAs may be able to use multiple channels. For example, an AP may have a primary channel and a number of secondary channels. Each of these channels may be any size, such as 20 MHz. For example, an AP may be configured to use four 20 MHz channels, which may be numbered from channel 1 to channel 4. One of these channels may be used as a primary channel, and the AP may be configured to transmit certain things on the primary channel. For example, the AP may be configured to transmit preambles to certain transmissions on the primary channel, but may transmit messages on any or all of the channels.

In some aspects, at times, an AP may change its primary channel from one channel to another. This may occur, for example, when one channel is found to be busy, but another channel may not be busy. For example, in some channel hopping schemes, an AP and one or more STAs may simultaneously hop to and communicate on another primary channel, if the AP detects a communication on the primary channel that does not also occupy the new primary channel.

Figure 3:
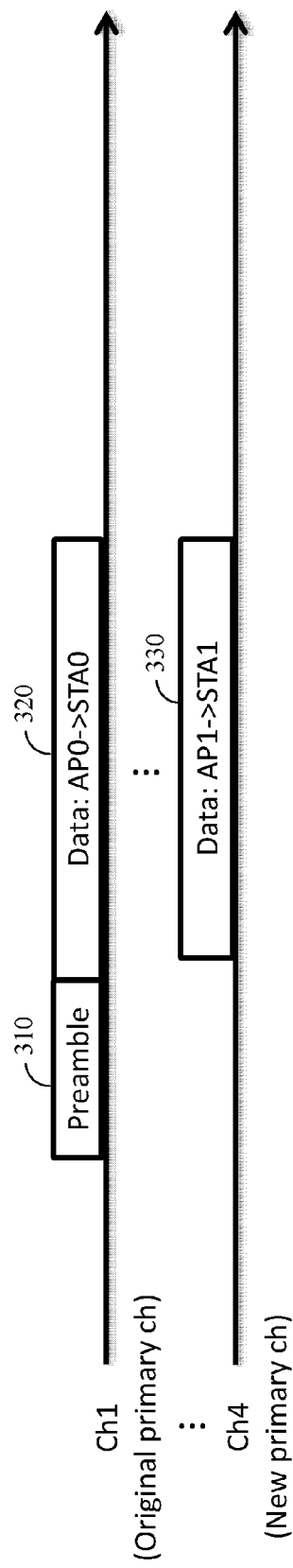
FIG. 3 is an illustration of a method of communicating on a new primary channel upon determining that an original primary channel is in use.

FIG. 3 is an illustration of a method of communicating on a new primary channel upon determining that an original primary channel is in use. An AP may be configured to use four channels, which are numbered from channel 1 to channel 4. In some aspects, channel 1 may be the original primary channel. The AP, which may be referred to as AP1, may wish to transmit to STA1. However, AP1 may determine that another AP, such as AP0, is transmitting 320 to a different STA, such as STA0, on the original primary channel, channel 1. Accordingly, after detecting AP0's packet preamble 310 indicating a 20 MHz transmission on channel 1, both AP1 and STA1 may be configured to hop to a pre-negotiated new primary channel, channel 4, for a transmission 330, which is typically ended no later than the end of the transmission 320, so AP1 can continue to monitor if channel 1 is busy or not after the transmission 320. In some aspects, AP1 may know the duration of transmission 320 from its preamble. When AP1 uses energy detection to detect transmission 320, it may not know the duration of transmission 320. Accordingly, AP1 may assume a typical duration for transmission 320, if the duration of transmission 320 is unknown.

For example, an AP may be configured to determine that channel 1 is busy during a first portion of a time slot. Based upon this determination, the AP may be configured to transmit on a second channel, such as channel 4, during the time that the first channel is busy. For example, if channel 1 is busy only for the first half of the time slot, the AP may transmit on channel 4 during the first half of the time slot, and may then return to channel 1 after the other communication on channel 1 has ended. For example, the AP may determine the duration of the communication on channel 1 based upon a preamble of the transmission, or based upon assuming that the transmission will be a transmission of an average duration.

It may be observed, however, that several things may cause transmission on the new primary channel to fail. For example, determining that channel 1 is busy may require that both AP1 and STA1 receive the preamble from AP0, indicating that AP0 will transmit on channel 1, and will not transmit on channel 4. Based on this reception, both AP1 and STA1 may be configured to hop to channel 4. However, either AP1 or STA1 may fail to receive the preamble on channel 1 from AP0. If their AP1 or STA1 fail to detect this preamble, the transmission between AP1 and STA1 on channel 4 will not be successful (as either AP1 won't send the transmission, or STA1 won't receive the transmission). Problems with detecting the preamble, for either AP1 or STA1, may be based on, for example, interference at either AP1 or STA1, which might render the device unable to decode the preamble from AP0. Accordingly, it may be desired to have alternative channel hopping schemes, in order to minimize these problems.

As noted, the transmission from AP1 to STA1 may fail for one of two reasons: Either the AP1 fails to hop correctly, or the STA1 fails to hop correctly. The second point of failure may be minimized, however, by having a different STA, such as STA2, "camping" (that is, waiting for a transmission) on the non-primary channel, such as channel 4. Thus, for example, instead of having STAs dynamically hopping to a new primary channel when interference is detected, some STAs may be selected to statically camp on the new primary channel (such as channel 4) for a given period of time. For example, this given period of time may be a beacon period.

Having STAs camp on a potential new primary channel may ensure that those STAs are surely on the new primary channel, when the AP hops to that channel. This may eliminate the chance that the AP hops to the new primary channel, but the STA fails to do so due to mis-detecting a preamble, such as an OBSS (overlapping basic service set) preamble from AP0. Other STAs, meanwhile, may still camp on the original primary channel, and may be served whenever the original primary channel is clear. Thus, for example, one or more STAs may be camped on two or more different channels, and the AP may determine which STAs to transmit to based, at least in part, on whether certain portions of the wireless medium are in use or not at a particular time.

Figure 4:
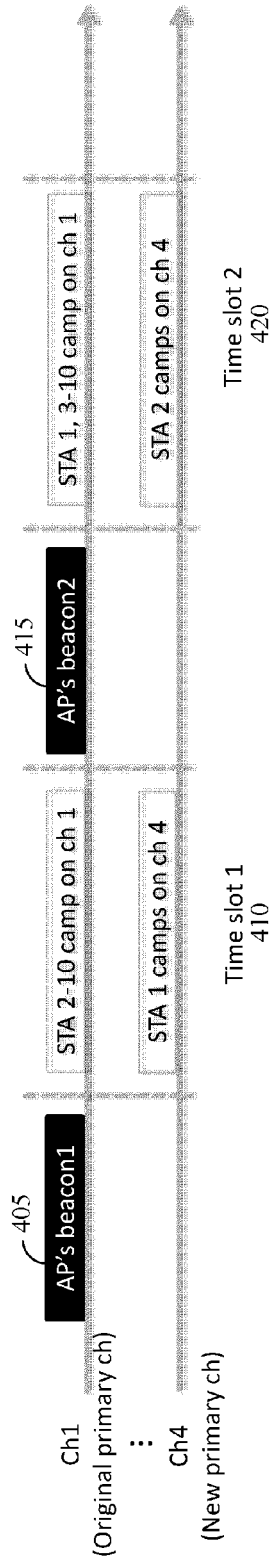
FIG. 4 is an example of having multiple stations camping on multiple channels.

FIG. 4 is an example of having multiple stations camping on multiple channels. For example, these channels may include channel 1 (the original primary channel) and channel 4 (a possible new primary channel, when channel 1 is occupied but channel 4 is free). The AP may transmit a first beacon 405. This beacon may contain instructions to various STAs associated with the AP, instructing those STAs to camp on various channels and to wait for communications on those channels until a next beacon, such as during time slot 1 410. For example, the first beacon 405 may instruct STA 1 to camp on channel 4, and may instruct STAs 2-10 to camp on channel 1. Accordingly, the AP may be configured to transmit to one or more of STAs 2-10 on the original primary channel if that channel is not in use. However, if channel 1 is in use but channel 4 is not in use, the AP may be configured to instead transmit to STA 1 on channel 4, the new primary channel. Accordingly, it may be observed that when using this scheme, only the AP needs to determine whether or not a channel is busy, rather than both the AP and a STA. Thus, this channel hopping scheme may have fewer errors than schemes which require that both the AP and the STA switch channels based on an OBSS preamble.

In a later beacon interval, the AP may transmit a second beacon 415. This second beacon 415 may instruct, for example, STA 2 to camp on channel 4, and may instruct the other STAs associated with the AP to camp on channel 1. As before, these instructions may be carried out until a next beacon interval such as during time slot 2 420, at which time, each STA may return to the primary channel in order to receive a next beacon. In some aspects, a beacon may instruct a STA to stay on a new primary channel for any length of time slot, rather than simply until a next beacon interval. In some aspects, the AP may alter which STAs are instructed to camp on the new primary channel periodically. For example, as illustrated here, STA 1 may camp on channel 4 for time slot 1, while STA 2 may camp on channel 4 for time slot 2. In some aspects, it may be beneficial to have different STAs camp on a new primary channel at different times, in order to allow each STA an equal opportunity to transmit and receive data with the AP.

Generally, having a STA camp on a new primary channel may be most effective for downlink transmissions, where an AP will transmit data to the STA. In an uplink transmission, wherein the STA may transmit data to the AP, the STA may not know when the AP will hop to the new primary channel and be available to receive a transmission. Thus, a camped STA may not start an uplink transmission after the AP hops to the new primary channel, as the camped STA may only start the uplink transmission when the AP is on the new primary channel (or the AP will not receive the transmission). This is because an AP may not receive the uplink transmission on the new primary channel when the AP is still on the original primary channel, as the AP may be configured to only decode preambles on its current primary channel.

Another issue on an uplink transmission from the camping STA is that STAs which are camped on the new primary channel may not detect transmissions from STAs on the original primary channel. Accordingly, the uplink transmission on the new primary channel may collide with transmissions from the STAs on the original primary channel. For example, STA 1 may be camped on the new primary channel (which may be 20 MHz), and STA 2 may be camped on the original primary channel (which may be 20 MHz). STA 2 may transmit a 20 MHz communication on the original primary channel, but STA 1 may not detect this, and may thus transmit an 80 MHz communication (on all four channels), which may collide with the transmission from STA 2.

Both of these problems may be solved by having the AP trigger uplink transmissions on the new primary channel, rather than having a STA transmit automatically. For example, an AP may determine that the original primary channel is in use, but that the new primary channel is not in use. Accordingly, the AP may hop to the new primary channel, and may send a trigger frame to the STA camping on the new primary channel in order to indicate that the STA may transmit uplink data. In some aspects, the AP may be aware that the camped STA or STAs have uplink data from previous transmissions (PPDUs) sent to the AP by the camped STA on the original primary channel. For example, these PPDUs may indicate "more data" and the STA's buffer size. Accordingly, this may inform the AP that the STA has additional data to transmit to the AP. Further, the AP may be configured to not hop to the new primary channel and send the trigger frame if there is an ongoing uplink transmission in the original primary channel Thus, the use of a trigger frame may alleviate both of the issues associated with an uplink transmission in the new primary channel.

Figure 5:
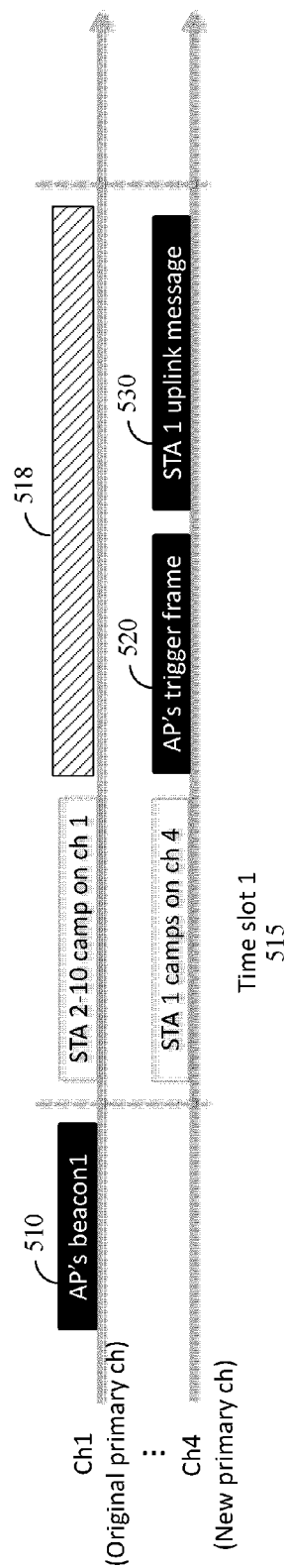
FIG. 5 is an illustration of transmitting a trigger frame to trigger an uplink transmission on a new primary channel.

FIG. 5 is an illustration of transmitting a trigger frame to trigger an uplink transmission on a new primary channel. For example, an AP may transmit a beacon 510 to a number of STAs associated with the AP. The beacon may, for example, be broadcast, such that each STA associated with the AP may receive the beacon. The beacon may contain instructions for one or more STAs, such as STA 1, to camp on a channel other than the original primary channel during time slot 1 515. For example, the beacon may instruct STA 1 to camp on channel 4, which may be used as a new primary channel if the original primary channel (such as channel 1) is in use, but channel 4 is available. The beacon may also contain instructions for other STAs, such as STA 2-10, to camp on the original primary channel. In some aspects, each STA not specifically instructed to camp on a new primary channel may camp on the original primary channel.

During time slot 1 515, STA 1 may camp on channel 4, while the other STAs in the BSS of the AP may camp on the original primary channel. The AP may determine, based on a preamble of an OBSS message, that the original primary channel may be busy 518 during at least a portion of time slot 1 515, while channel 4 may be idle. Further, the AP may be aware that STA 1 wishes to transmit an uplink message. For example, a previous message from STA 1 to the AP may have included an indication that STA 1 has more data to transmit. Thus, the AP may transmit a trigger frame 520 to STA 1. This trigger frame may be transmitted on channel 4, as that is the channel STA 1 is camping on, and may indicate to STA 1 that it may transmit an uplink message to the AP on channel 4. For example, the trigger frame 520 may include a duration, indicating a duration that STA 1 may transmit an uplink message for. STA 1, upon receiving the trigger frame 520, may transmit an uplink message 530 on channel 4. The use of this trigger frame 520 may allow STA 1 to transmit the uplink message 530 to the AP on the new primary channel, and may prevent certain issues with transmitting an uplink message on a non-primary channel, as described above.

In some aspects, certain information may be broadcast by an AP to all STAs associated with the AP. However, if certain STAs are camped on a channel other than the original primary channel, they may not receive these broadcast messages. For example, an AP may send broadcast or multicast data only on the original primary channel if, for example, other channels are sensed to be busy. This may cause devices on the other channels not to receive this information.

A number of options are possible to reduce the problem of missed broadcast/multicast data for camped STAs. First, an AP may be configured not to schedule STAs to camp on a new primary channel if the AP knows in advance that there is a pending broadcast or multicast transmission. For example, the AP may be aware of a coming broadcast transmission, and based on this awareness, may choose not to assign any STAs to the new primary channel during that time interval.

Second, an AP may later unicast messages to camped STAs when hopping to the new primary channel. Alternatively, the AP may later unicast the message to camped STAs when those STAs return to the original primary channel. For example, if the AP determines that the camped STAs may have missed a broadcast or multicast message, that message may later be unicast to the camped STAs, either on the new primary channel or later when the camped STA returns to the original primary channel.

In some aspects, an AP may select which STAs may camp on a new primary channel based on various criteria. For example, an AP may instruct a STA to camp on a new primary channel when that STA and the AP have a low success rate for simultaneously hopping to a new primary channel. In some aspects, an AP can request that STAs with a low success rate for hopping always camp on the original primary channel, and not use dynamic hopping of channels with those STAs. For example, the STA camping methods described herein may be used selectively by the AP, such as using these methods on only a subset of the STAs associated with the AP.

For example, an AP may be aware that certain STAs can simultaneously hop with the AP at a very high success rate, and may use simultaneous hopping with those STAs. STAs with a high success rate, when they are due to transmit or receive a message in a given time slot, may be instructed to camp on the original primary channel, and to hop to the new primary channel if they detect the original primary channel is busy but the new primary channel is not. This selective hopping may be successful with certain STAs, but may have a lower success rate with other STAs. Accordingly, the AP may be aware of the success rate of selective hopping with various STAs on the network. Thus, the AP may be configured to use selective hopping with certain STAs in the BSS, but may use STA camping with other STAs (such as those with a low success rate for selective hopping). Thus, for example, STA camping may be used in conjunction with simultaneous hopping.

A number of different options may be used for detecting a low success rate of simultaneous hopping. For example, an AP may compare the number of times that a given STA hops to a new primary channel compared to the number of times that the AP hops to a new primary channel. Generally, an AP may broadcast its hopping times in a previous beacon cycle in each beacon. A STA may report a low success rate for hopping if the STA has very different hopping times than the AP. Accordingly, based on these reports, the AP may avoid using dynamic (or simultaneous) hopping with that STA, and may instead assign that STA to either the original primary channel or a new primary channel.

In some aspects, an AP may determine that a particular STA detects only a small portion of AP transmissions (such as PPDUs) on a new primary channel in a given period. For example, the AP may broadcast the number of transmitted PPDUs transmitted PPDUs on a new primary channel in a last beacon cycle at a next beacon. That is, when an AP transmits a beacon, it may include information about how many PPDUs were transmitted on new primary channels in the previous interval. A STA may receive this information, and may determine that it is detecting only a small portion of those PPDUs. For example, other time, the STA may keep track of how many PPDUs the AP transmits on new primary channels, and how many of those PPDUs were detected by the STA. The STA may then report to the AP if the STA is detecting only a small portion of those PPDUs, such as when the STA is detecting a portion of the PPDUs that is below some threshold value. In some aspects, the AP itself may detect low success rates of a STA. For example, the AP may noticed that it receives a low number of ACK messages from the STA when transmitting PPDUs to the STA on a new primary channel Thus, the AP may determine that the STA has a low success rate when switching to a new primary channel. When the AP determines that an STA has a low success rate when switching, the AP may avoid switching when transmitting to that STA. For example, if the AP is going to transmit to that STA on the original primary channel, the AP may assign a different STA to camp on the new primary channel, in order to avoid asking the low-success STA to switch channels.

In some aspects, an AP may determine that a STA detects only a small portion of AP-transmitted PPDUs on the original primary channel. Thus, the AP may not assign that STA to receive transmissions on the original primary channel, and may instead assign that STA to camp on a new primary channel instead. This detection of a low success rate on the original primary channel may be done using the methods above—either the STA may communicate a low success rate to the AP, or the AP may determine a low success rate, such as by using received ACK messages from the STA (or lack thereof). In some aspects, a low success rate on the original primary channel for a given STA may imply that the STA frequently hops to the new primary channel (detecting interference on the original primary channel) at times when the AP does not hop. Accordingly, the AP may avoid allowing that particular STA to hop channels, as such channel-hopping may reduce the success rate of the STA.

Thus, certain STAs may be permitted to dynamically hop channels when they detect interference, while other STAs may be asked not to hop channels. The AP may choose which STAs dynamically hop and which do not dynamically hop (and instead use secondary channel camping) based on the above factors. Other factors relating to the relative success and failure rates of various STAs to hop successfully may also be used.

Figure 6:
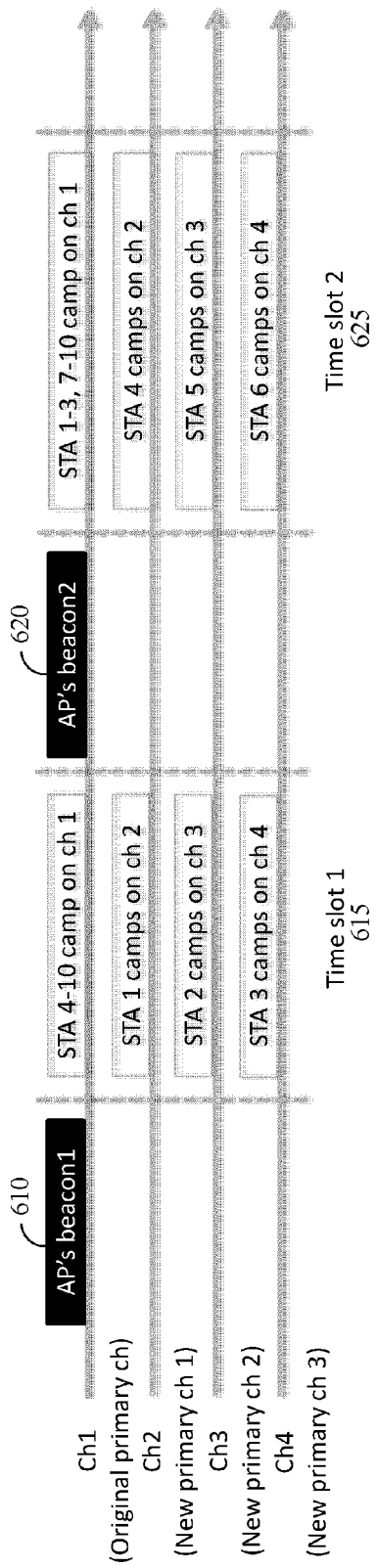
FIG. 6 is an illustration of assigning different stations to camp on multiple channels during different time slots.

FIG. 6 is an illustration of assigning different stations to camp on multiple channels during different time slots. For example, a situation may arise whereby both an original primary channel and a new primary channel may be in use during all or part of a time slot. Thus, if only two channels are identified, it may not be possible to transmit during this time slot, even if other channels are not in use.

Thus, it may be beneficial to assign STAs to camp on more than one additional channel. For example, an AP may be configured to use four different 20 MHz channels, which may be identified as channels 1-4. In some aspects, channel 1 may be identified as the original primary channel, and may contain beacon messages. In a beacon message 610, the AP may instruct one or more STAs to camp on channels other than the primary channel during a given time slot, such as time slot 1 615. For example, the AP may assign STAs to camp on each of channels 2, 3, and 4 (that is, all of the non-primary channels), and have the remainder of the STAs camp on the original primary channel By having different STAs camping on each of the channels in the BSS, the AP may be able to switch to any of the other channels upon determining that the original primary channel is in use.

In some aspects, the channels other than the original primary channel may be ranked. For example, the AP may determine that the original primary channel is occupied, but that each of the other channels is available. Accordingly, the AP may instead transmit on new primary channel 1, which may be, for example, channel 2. Similarly, if the AP determines that both channel 1 and channel 2 are in use, the AP may transmit on new primary channel 2, which may be channel 3. Finally, if the AP determines that all other channels are occupied, the AP may transmit on new primary channel 3, which may be channel 4. In some aspects, the use of rankings or a hierarchy of channels may allow the AP to make use of the wireless medium more efficiently. Further, the AP may be configured to select which STAs to camp on certain channels based on, for example, a priority of the device. For example, an AP may determine that a particular STA is a higher priority than another STA (perhaps because, for example, one STA has more time-sensitive data that is due to be delivered to it). Accordingly, the AP may assign that STA to camp on a channel that is higher in the hierarchy, such as the original primary channel or new primary channel 1, rather than new primary channel 3.

Accordingly, as illustrated in FIG. 6, the AP may transmit a beacon 610 which instructs STA 1-3 to camp on each of channels 2-4, respectively, while instructing the other STAs to remain on channel 1, the original primary channel during time slot 1 615. Similarly, in a next beacon 620, the AP may instruct other STAs to camp on channels 2-4 during time slot 2 625. As illustrated, in each time slot, the AP may instruct either the same STAs, or different STAs, to camp on a given channel. For example, during time slot 1 615, the AP may instruct STA 1 to camp on channel 2, while during time slot 2 625, the AP may instruct STA 4 to camp on channel 2. It may be advantageous to alternate which STAs are camped on various channels, as this may allow the AP to ensure that STAs have an equal chance of access to the wireless medium. Generally, upon detecting OBSS PPDUs on the original primary channel (channel 1) but does not occupy some of the new primary channels, the AP may hop to one of the unoccupied channels. For example, the AP may hop to one unoccupied new primary channel and may transmit on that channel to the corresponding camped STA if the AP determines that there is not transmission on the new primary channel. For example, the AP may attempt to detect energy and/or a packet preamble on the new primary channel, in order to determine if that channel is in use. If the new primary channel is determined to be in use, the AP may be configured to hop to a different new primary channel, and use the same methods to determine if that new primary channel is in use.

In some aspects, an AP may assign a group of STAs to camp on a particular channel. For example, an AP may assign a group of STAs to camp on each of channels 1-4. These groups may be rotated, in order to ensure fair access to the wireless medium between groups. For example, these assignments may be made based on a Group ID, or another signaling mechanism.

Figure 7:
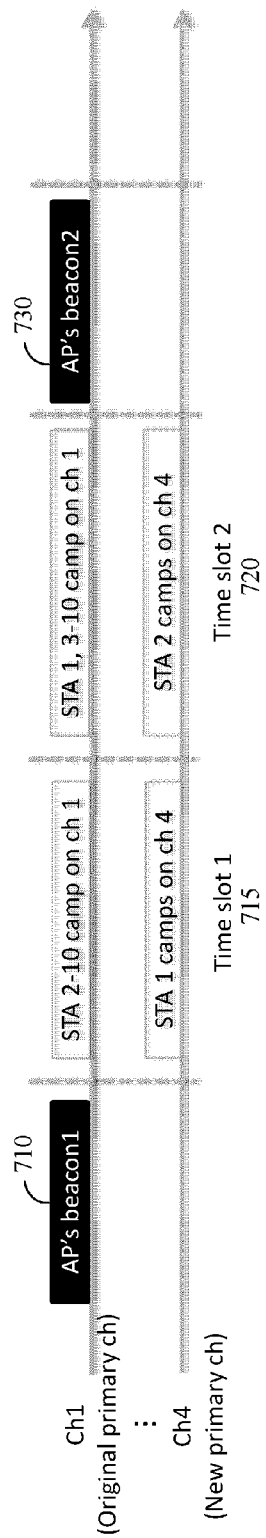
FIG. 7 is an illustration of a beacon which includes different camping schedules for two time slots.

In some aspects, instead of a single time slot, each beacon interval may be divided into two or more time slots, and each beacon may include camping schedules for each of those time slots. The camping schedules for each of the time slots may be the same as each other, or may be different. FIG. 7 is an illustration of a beacon which includes different camping schedules for two time slots. For example, an AP may transmit beacon1 710. Beacon1 710 may include camping instructions for each STA for each of the time slots which occur after beacon1 710 and before beacon2 730. For example, beacon1 may include camping instructions for both time slot 1 715 and time slot 2 720. These camping instructions for each time slot may be the same as each other, or may be different.

For example, beacon1 710 may instruct STA 1 to camp on channel 4 during time slot 1 715, and may instruct each of the other STAs in the BSS to remain on channel 1, the original primary channel, during time slot 1 715. Beacon1 710 may also contain further instructions which instruct STA 2 to camp on channel 4 in time slot 2 720, and which instruct the other STAs in the BSS (including STA 1) to camp on channel 1, the original primary channel, in time slot 2 720. Accordingly, a single beacon may provide instructions for two or more time slots. This may allow, for example, one beacon interval (the period of time between two beacons) to be divided into multiple time slots. This division, and the assignment of different STAs to camp on different channels in the various time slots, may help ensure fair access to the wireless medium for each of the STAs in the BSS of the AP.

For example, beacon1 710 may include information about both time slot 1 715 and time slot 2 720. This information may include an indication of what time both of these time slots will begin. The information may also include an indication of what time both of these time slots will end. For example, this indication may take the form of a start time of time slot 1 715, a start time of time slot 2 720, and an indication of duration of one or more of the time slots.

Figure 8:
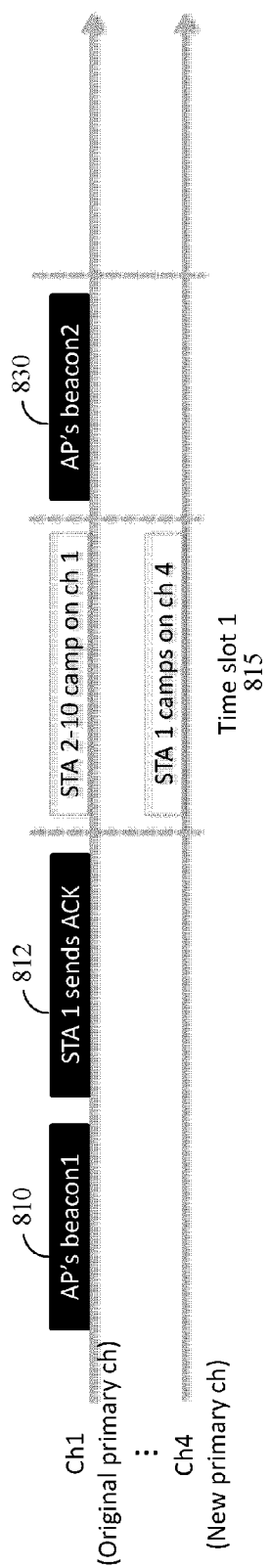
FIG. 8 is an illustration of a station sending an acknowledgement message in response to instructions for that station to camp on a new primary channel.

In some aspects, a STA may send an acknowledgement (ACK) message in response to being instructed to camp on a new primary channel. FIG. 8 is an illustration of a station sending an acknowledgement message in response to instructions for that station to camp on a new primary channel. This ACK may be useful, as the AP may be configured to only hop to the new primary channel if it received an ACK from the STA on that channel. Further, the AP may only transmit to or receive from confirmed STAs after hopping to the new channel, and may not communicate with STAs that did not send an ACK. For example, an AP may instruct multiple STAs to camp on a new primary channel. The AP may receive ACK messages from only some of those STAs. Accordingly, the AP may choose to transmit or receive (if the AP hops to the new primary channel) from only the STAs that send ACK messages indicating that those devices will be on the new primary channel.

For example, an AP may transmit a beacon1 810. The beacon1 810 may contain instructions for STA 1 to camp on channel 4, which is a new primary channel, during time slot 1 815. Accordingly, STA 1 may receive the beacon1 810 from AP, and may transmit an ACK 812 to the AP, indicating that the STA received the instructions contained in beacon1 810. This ACK 812 may allow the AP to know the STA 1 will be on channel 4 during time slot 1 815, and thus, the AP may transmit to STA 1 during time slot 1 on channel 4.

In some aspects, the AP may use various methods to determine whether or not a given channel is in use. As described above, the AP may look for an OBSS preamble indicating that an OBSS device may be transmitting on a given channel. Alternatively, the AP may instead (or additionally) hop to another channel based upon energy detection. Specifically, the AP may hop to a new primary channel if energy detection indicates that the new primary channel is busy, but that the new primary channel is unoccupied. Accordingly, switching channels may be based on energy detection, rather than detecting an OBSS preamble.

Similarly, after hopping, whether or not an AP transmits on a new primary channel may be based, at least in part, on energy detection as well. For example, the AP may transmit on a new primary channel is energy and/or preamble detection indicates that the new primary channel is clean. Either of these methods, or both in combination, may be used to determine if the new primary channel is in use or not. If the new primary channel is not clean, the AP may then hop to another new primary channel, such as hopping from new primary channel 1 to new primary channel 2.

Figure 9:
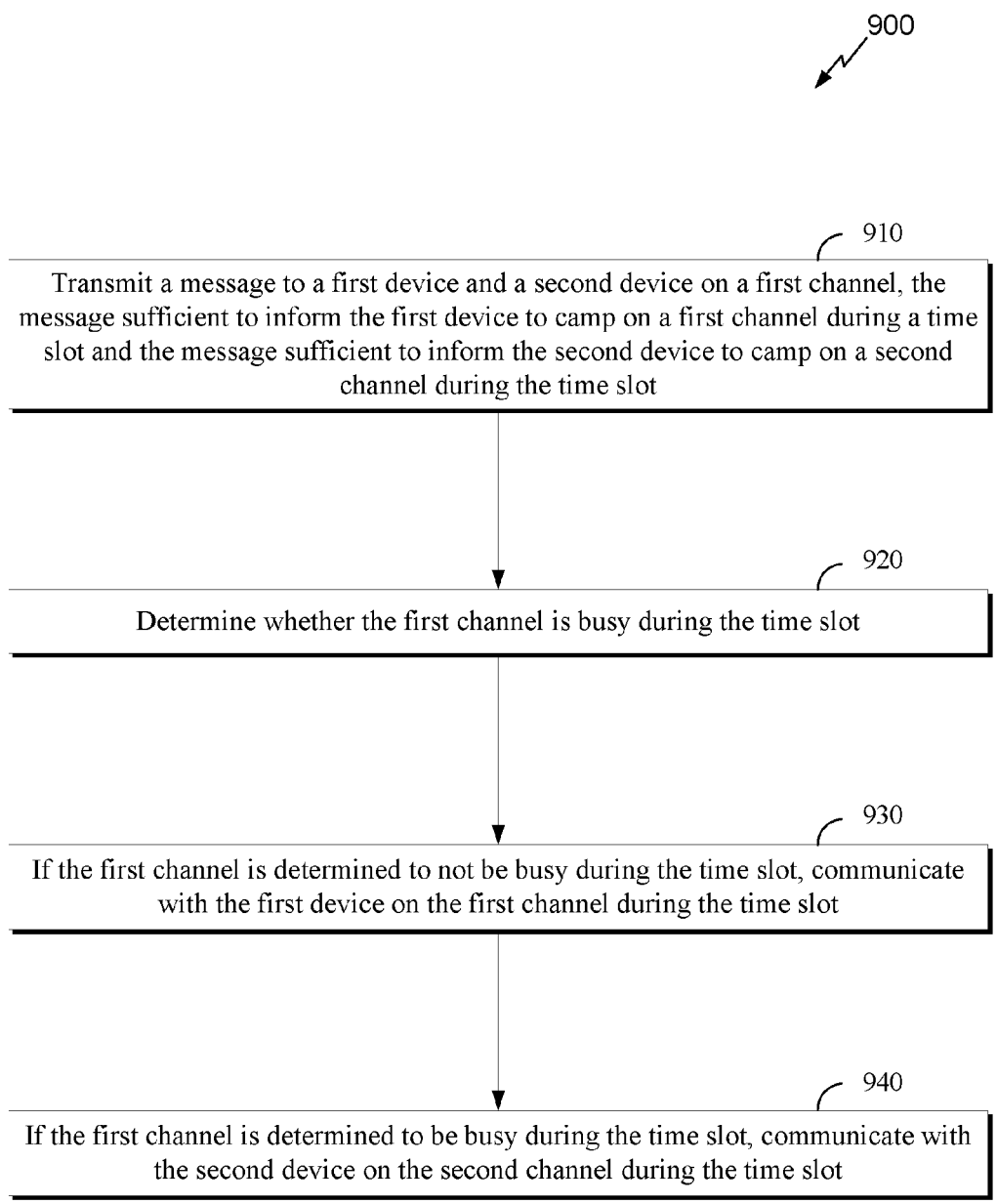
FIG. 9 illustrates a method of communicating on a wireless communication network according to some aspects of the present disclosure.

FIG. 9 illustrates a method of communicating on a wireless communication network according to some aspects of the present disclosure. This method may be done by an AP on a BSS. This method may be used when the AP has access to two or more channels, and when there are two or more devices within the BSS. This method may allow for more efficient use of the wireless medium, as described above. This method may be especially beneficial when there are OBSSes in the area, such that certain channels may, at times, not be available for the AP to use.

At block 910, the AP transmits a message to a first device and a second device on a first channel, the message sufficient to inform the first device to camp on a first channel during a time slot and the message sufficient to inform the second device to camp on a second channel during the time slot. In some aspects, the first channel may include a primary channel of the BSS, such as an original primary channel. In some aspects, the second channel may include a new primary channel of the BSS, that the AP may switch to upon determining that the first channel is in use, but that the second channel is not. In some aspects, the message may include a beacon, and the time slot may include a period of time between the beacon and a next beacon (such as a beacon interval). In some aspects, rather than assigning a single device to a given channel, the AP may assign two or more devices to one or more of the channels. For example, the AP may assign a group of devices to camp on a new primary channel, and may assign the remainder of the devices to remain on the original primary channel. In some aspects, the assignment of the remainder of the devices to the original primary channel may be inferred from a lack of other assignments for those devices. That is, devices may be configured to, by default, remain on the original primary channel, and so if a device is not assigned to a new primary channel, that device may remain on the original primary channel. In some aspects, the means for transmitting may include a transmitter.

In some aspects, the message may further instruct a third device to camp on a third channel, such that the third channel may be used if both the first and the second channels are busy, but the third channel is available. Any number of channels may be used in this manner, such as describe above wherein there may be an original primary channel and three new primary channels. In some aspects, the message may further include an indication for a third device to camp on the first channel during a second time slot, and for a fourth device to camp on the second channel during a second time slot. For example, the message may include indications for not just a single time slot, but for one or more additional time slots as well. Thus, for example, a beacon may divide an interval between consecutive beacons into two or more time slots, and the camping instructions for each of these time slots may be contained within the beacon.

In some aspects, the AP may be further configured to receive a message from one or more of the first device or the second device, the message indicating that the sending device will camp on the assigned channel. For example, the AP may be configured to only hop to a channel and transmit to a device on that channel if the AP receives an ACK message from the device, indicating the device received its channel assignment and will be on the assigned channel. In some aspects, the AP may determine which STAs should camp on which channels using a variety of information and considerations, such as the success rate of those STAs at receiving transmissions on certain channels, ensuring fair access to the wireless medium, and a success rate of various STAs in hopping to another channel.

At block 920, the AP determines whether the first channel is busy during the time slot. In some aspects, determining whether the first channel is busy may include determining this using one or more of a preamble detection and an energy detection. In some aspects, the means for determining may include one or more of a receiver and a processor. For example, a receiver may be used to receive signals from a channel (used for energy detection or preamble detection), and the processor may be used to decode these signals.

At block 930, the AP, if the first channel is determined to not be busy during the time slot, communicate with the first device on the first channel during the time slot. This communication may include transmitting a transmission to the first device on the first channel, and/or receiving a transmission from the first device on the first channel. In some aspects, this transmission may also be transmitted on other channels in addition to the first channel. In some aspects, the means for communicating may include a processor, a receiver, and/or a transmitter.

At block 940, the AP, if the first channel is determined to be busy during the time slot, communicate with the second device on the second channel during the time slot. In some aspects, communicating with the second device may include determining if the second channel is busy. If the channel is not busy, communicating may include either transmitting a transmission to the second device on the second channel, or receiving a transmission from the second device on the second channel, or both, such as transmitting a trigger message which instructs the second device to begin an uplink transmission, and then receiving the uplink transmission. This transmission may also be transmitted on other channel that the second channel. In some aspects, other devices may be assigned to channels other than the first and second channel, and when both the first and second channels are in use, those other devices may be transmitted to (or received from) on those other channels. For example, there may be a number of such channels that may be used, based upon a hierarchy, by determining that channels higher than those channels are in use. In some aspects, the means for communicating may include a processor, a receiver, and/or a transmitter.

Figure 10:
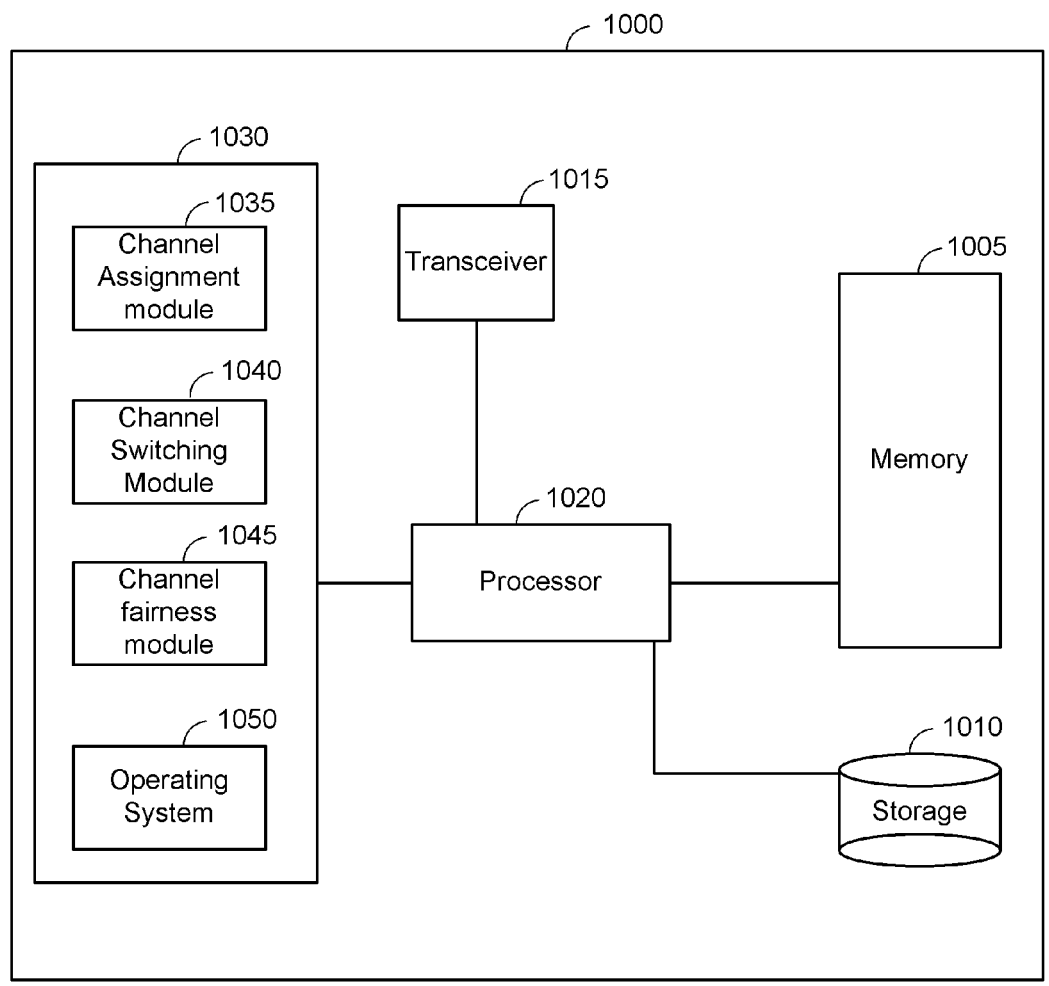
FIG. 10 depicts a high-level block diagram of a device having a set of components including a processor operatively coupled to a transceiver.

FIG. 10 depicts a high-level block diagram of a device 1000 having a set of components including a processor 1020 operatively coupled to a transceiver 1015. A working memory 1005, storage 1010, and memory 1030 are also in communication with and operative attached to the processor. Device 1000 may be a device configured to operate on a wireless communications network. Device 1000 may be configured to use the station camping procedures described herein, such as being configured to operate as a station channel controller 135.

The transceiver 1015 may be configured to transmit and receive communications on the wireless communication network. It may be implemented as a transceiver 1015, or as a separate receiver and transmitter. In either case, the transceiver 1015 may be operable connected to a processor 1020, in order to allow the device to transmit and receive on the wireless medium according to certain station camping principles. For example, the transceiver 1015 may be able to transmit to other devices, in order to indicate to those devices to camp on alternative channels.

Processor 1020 may be a general purpose processing unit or a processor specially designed for the disclosed methods. As shown, the processor 1020 is connected to a memory 1030 and a working memory 1005. In the illustrated embodiment, the memory 1030 stores local channel assignment module 1035, channel switching module 1040, channel fairness module 1045, and operating system 1050. These modules include instructions that configure the processor to perform various tasks. Working memory 1005 may be used by processor 1020 to store a working set of processor instructions contained in the modules of memory 1030.

Alternatively, working memory 1005 may also be used by processor 1020 to store dynamic data created during the operation of device 1000.

As mentioned above, the processor 1020 is configured by several modules stored in the memories. For example, the channel assignment module 1035 may include instructions sufficient to configure the processor 1020 to determine and transmit instructions to various wireless devices, which instruct those wireless devices to camp on certain channels for certain periods of time. The channel assignment module 1035 may be configured to determine which devices should camp on which channels, and to transmit instructions, such as using the transceiver 1015, to those devices. For example, the instructions may be included in a beacon, which may indicate to the devices which channel those devices should camp on.

The memory 1030 may also contain a channel switching module 1040. The channel switching module 1040 may contain instructions which configured to processor 1020 to switch between channels at certain times. For example, the channel switching module 1040 may contain code which causes the processor 1020 to use the transceiver 1015 to determine if a channel is in use. If that channel is in use, the channel switching module 1040 may contain code which configures the processor 1020 to switch to another channel, where the device 1000 may transmit or receive transmissions to the device assigned to that channel by the channel assignment module 1035.

The memory 1030 may also contain a channel fairness module 1045. This module may be used in conjunction with the channel assignment module 1035, in order to allow for fair access to the wireless medium. For example, the channel fairness module 1045 may contain instructions that permit fair access of the wireless medium by various devices. This may be enforced in a number of ways, such as by having the devices camping on various non-primary channels rotated, such that different devices camp on different channels over time.

Operating system module 1050 configures the processor to manage the memory and processing resources of device 1000. For example, operating system module 1050 may include device drivers to manage hardware resources such as the transceiver 1015 or storage 1010. Therefore, in some embodiments, instructions contained in modules discussed above may not interact with these hardware resources directly, but instead interact through standard subroutines or APIs located in operating system component 1050. Instructions within operating system 1050 may then interact directly with these hardware components.

Processor 1020 may write data to storage module 1010. While storage module 1010 is represented graphically as a traditional disk device, those with skill in the art would understand multiple embodiments could include either a disk based storage device or one of several other type storage mediums to include a memory disk, USB drive, flash drive, remotely connected storage medium, virtual disk driver, or the like.

FIG. 10 depicts a device having separate components to include a processor, and memory, one skilled in the art would recognize that these separate components may be combined in a variety of ways to achieve particular design objectives. For example, in an alternative embodiment, the memory components may be combined with processor components to save cost and improve performance.

Additionally, although FIG. 10 shows two memory components, to include memory component 1030 having several modules, and a separate memory 1005 having a working memory, one with skill in the art would recognize several embodiments utilizing different memory architectures. For example, a design may utilize ROM or static RAM memory for the storage of processor instructions implementing the modules contained in memory 1030. Alternatively, processor instructions may be read at system startup from a disk storage device that is integrated into device 1000 or connected via an external device port. The processor instructions may then be loaded into RAM to facilitate execution by the processor. For example, working memory 1005 may be a RAM memory, with instructions loaded into working memory 1005 before execution by the processor 1020.

Implementing Technology

In some of the foregoing implementations, a message from an access point specifies a restricted access window, a period of time that the access point declares as reserved for a selected group of wireless stations, such as one specified in the 802.11ah protocol. Alternatively, the message may specify an access window during which access to the medium is granted to all wireless stations. In other words, the access point will accept a packet from all wireless stations during the access window.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like. Further, a "channel width" as used herein may encompass or may also be referred to as a bandwidth in certain aspects.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

In one or more aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Thus, in some aspects computer readable medium may comprise non-transitory computer readable medium (e.g., tangible media). In addition, in some aspects computer readable medium may comprise transitory computer readable medium (e.g., a signal). Combinations of the above should also be included within the scope of computer-readable media.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

What is claimed is:

1. A method for transmitting over a wireless communications network, the method comprising:
   transmitting a message to a first device and a second device on a first channel, the message sufficient to inform the first device to camp on a first primary channel during a time slot and the message sufficient to inform the second device to camp on a second primary channel during the time slot;
   determining whether the first primary channel is busy during the time slot;
   if the first primary channel is determined to not be busy during the time slot, communicating with the first device on the first primary channel during the time slot; and
   if the first primary channel is determined to be busy during the time slot, hopping from the first primary channel to the second primary channel and communicating with the second device using the second primary channel during the time slot instead of communicating with the first device on the first primary channel during the time slot.

2. The method of claim 1, wherein the message comprises a beacon.

3. The method of claim 1, wherein the time slot comprises a period of time until a next beacon.

4. The method of claim 1, further comprising prior to hopping to the second primary channel, determining whether to communicate with the second device on the second primary channel during the time slot by determining if the second channel is busy during the time slot and in response to the second primary channel being not busy, performing the communicating with the second device on the second primary channel during the time slot.

5. The method of claim 4, wherein the communicating with the second device on the second primary channel comprises transmitting a trigger frame to the second device on the second primary channel indicating that the second device may transmit an uplink transmission.

6. The method of claim 1, wherein determining whether the first primary channel is busy during the time slot comprises determining that the first primary channel is busy during a first portion of the time slot, and wherein communicating with the second device on the second primary channel during the time slot comprises communicating with the second device on the second primary channel during the first portion of the time slot.

7. The method of claim 1, the message further transmitted to a third device, the message sufficient to inform the third device to camp on a third channel during a second time slot, the method further comprising:
if the first primary channel and the second primary channel are determined to be busy during the second time slot, communicating with the third device on the third primary channel during the second time slot.

8. The method of claim 1, wherein the message informs two or more devices to camp on the first primary channel, and further informs two or more devices to camp on the second primary channel.

9. The method of claim 1, further comprising receiving a second message from one or more of the first device and the second device, the second message indicating that the device transmitting the second message will camp on an assigned channel.

10. The method of claim 1, wherein determining whether the first primary channel is busy during the time slot comprises using one or more of preamble detection and energy detection to determine whether the first primary channel is busy during the first time slot.

11. The method of claim 1, wherein the message is further sufficient to inform a third device to camp on the first primary channel during a second time slot and the message sufficient to inform a fourth device to camp on the second primary channel during the second time slot, wherein the first time slot is a first beacon interval and the second time slot is a second different beacon interval subsequent to the first beacon interval.

12. The method of claim 1, further comprising:
if the first primary channel is determined to not be busy during the time slot, communicating with a first plurality of devices including the first device on the first primary channel during the time slot; and
if the first primary channel is determined to be busy during the time slot, communicating with a second plurality of devices including the second device on the second primary channel during the time slot.

13. The method of claim 12, wherein the message is sufficient to inform the first plurality of devices to camp on the first primary channel during the time slot and the message is sufficient to inform the second plurality of devices to camp on the second primary channel during the time slot.

14. A device for transmitting over a wireless communications network, the device comprising:
a transmitter configured to transmit a message to a first device and a second device on a first channel, the message sufficient to inform the first device to camp on a first primary channel during a time slot and the message sufficient to inform the second device to camp on a second primary channel during the time slot; and
a processor configured to:
determine whether the first channel is busy during the time slot;
if the first primary channel is determined to not be busy during the time slot, communicate with the first device on the first primary channel during the time slot; and
if the first primary channel is determined to be busy during the time slot, hopping from the first primary channel to the second primary channel and communicating with the second device using the second primary channel during the time slot instead of communicating with the first device on the first primary channel during the time slot.

15. The device of claim 14, wherein the message comprises a beacon.

16. The device of claim 14, wherein the time slot comprises a period of time until a next beacon.

17. The device of claim 14, further comprising prior to the communicating, determining whether to communicate with the second device on the second primary channel during the time slot by determining if the second channel is busy and in response to the second channel being not busy, communicating with the second device on the second channel.

18. The device of claim 17, wherein communicating with the second device on the second primary channel comprises transmitting a trigger frame to the second device on the second primary channel indicating that the second device may transmit an uplink transmission.

19. The device of claim 14, the message further transmitted to a third device, the message sufficient to inform the third device to camp on a third primary channel during a second time slot, the processor further configured to:
if the first primary channel and the second primary channel are determined to be busy during the second time slot, communicate with the third device on the third primary channel during the second time slot.

20. The device of claim 14, wherein the message informs two or more devices to camp on the first primary channel, and further informs two or more devices to camp on the second primary channel.

21. The device of claim 14, the processor further configured to receive a second message from one or more of the first device and the second device, the second message indicating that the device transmitting the second message will camp on an assigned channel.

22. The device of claim 14, wherein determining whether the first primary channel is busy during the time slot comprises using one or more of preamble detection and energy detection to determine whether the first primary channel is busy during the first time slot.

23. The device of claim 14, wherein the message is further sufficient to inform a third device to camp on the first primary channel during a second time slot and the message sufficient to inform a fourth device to camp on the second primary channel during the second time slot, wherein the first time slot is a first beacon interval and the second time slot is a second different beacon interval subsequent to the first beacon interval.

24. A device for transmitting over a wireless communications network, the device comprising:
means for transmitting a message to a first device and a second device on a first channel, the message sufficient to inform the first device to camp on a first primary channel during a time slot and the message sufficient to inform the second device to camp on a second primary channel during the time slot;
means for determining whether the first primary channel is busy during the time slot;

means for communicating with the first device on the first primary channel during the time slot if the first primary channel is determined to not be busy during the time slot;

means for hopping from the first primary channel to the second primary channel if the first primary channel is determined to be busy during the time slot; and means for communicating with the second device using the second primary channel during the time slot instead of communicating with the first device on the first primary channel during the time slot if the first primary channel is determined to be busy during the time slot.

25. The device of claim 24, wherein the message comprises a beacon.

26. The device of claim 24, further comprising means for determining whether to communicate with the second device on the second channel.

27. The device of claim 24, the message further transmitted to a third device, the message sufficient to inform the third device to camp on a third primary channel during a second time slot, the device further comprising:

means for communicating with the third device on the third primary channel during the second time slot if the first primary channel and the second primary channel are determined to be busy during the second time slot.

28. A non-transitory computer-readable medium comprising code that, when executed, causes an apparatus to:

transmit a message to a first device and a second device on a first channel, the message sufficient to inform the first device to camp on a first primary channel during a time slot and the message sufficient to inform the second device to camp on a second primary channel during the time slot;

determine whether the first primary channel is busy during the time slot;

if the first primary channel is determined to not be busy during the time slot, communicate with the first device on the first primary channel during the time slot; and if the first primary channel is determined to be busy during the time slot, hopping from the first primary channel to the second primary channel and communicating with the second device using the second primary channel during the time slot instead of communicating with the first device on the first primary channel during the time slot.

29. The non-transitory computer-readable medium of claim 28, wherein the message comprises a beacon.

30. The non-transitory computer-readable medium of claim 28, the method further comprising determining whether to communicate with the second device on the second primary channel by transmitting a trigger frame to the second device on the second channel indicating that the second device may transmit an uplink transmission.

\* \* \* \* \*